United States Patent [19]
Keller

[11] 4,087,688
[45] May 2, 1978

[54] INFRARED RADIATION-BURGLARY DETECTOR

[75] Inventor: Hansjürg Keller, Mannedorf, Switzerland

[73] Assignee: Cerberus AG, Mannedorf, Switzerland

[21] Appl. No.: 738,908

[22] Filed: Nov. 4, 1976

[30] Foreign Application Priority Data

Jun. 16, 1976  Switzerland .................. 7592/76

[51] Int. Cl.² .................. G08B 13/18; G01J 1/02
[52] U.S. Cl. .................. 250/342; 250/338; 250/353; 350/1.4
[58] Field of Search .............. 250/338, 340, 342, 353; 340/258 D; 350/1, 2

[56] References Cited

U.S. PATENT DOCUMENTS

| | | | |
|---|---|---|---|
| 3,413,468 | 11/1968 | Astheimer | 250/338 |
| 3,571,572 | 3/1971 | Falbel | 250/353 |
| 3,777,160 | 12/1973 | Bernt | 250/338 |
| 3,839,640 | 10/1974 | Rossin | 250/342 X |
| 3,864,566 | 2/1975 | Simpson et al. | 250/342 X |

*Primary Examiner*—Archie R. Borchelt
*Attorney, Agent, or Firm*—Werner W. Kleeman

[57] ABSTRACT

An infrared radiation-burglary detector comprising an optical system for focusing the radiation upon a radiation receiver. One or more internally reflecting prism surfaces enclose the axis of the optical system and are arranged substantially parallel to such axis.

15 Claims, 3 Drawing Figures

$$tg\, \alpha_n = n \cdot \frac{d}{f}$$

INFRARED RADIATION-BURGLARY DETECTOR

BACKGROUND OF THE INVENTION

The present invention relates to a new and improved construction of an infrared radiation-burglary detector — also referred to in the art as an infrared intrusion detector — which is of the type comprising an optical system for focusing the radiation upon a radiation receiver.

Such detectors are constructed to receive infrared radiation emanating from a supervised room or area and upon variation of such infrared radiation to deliver an alarm signal by means of a suitable evaluation circuit. To detect an intruder or other person who has unlawfully entered the room or area which is supervised, there is preferably utilized infrared radiation within a wavelength range which is characteristic of the inherent radiation of humans, for instance the range up to 20 $\mu$ or particularly the range between 14 $\mu$ and 7 $\mu$. However, instead of such there also can be employed external radiation from a radiation source in a suitable wavelength range which can be better handled, for instance in near infrared above 1 $\mu$, which is reflected by the individuals who are to be detected. In any event the permeability or the reflection capability of the optical system and the sensitivity of the radiation receiver must be tuned to this wavelength range.

In order to be able to already detect even the slightest movements of a person, for instance a burglar or other intruder, in the protected room or area, it has been found to be advantageous to provide individual separate receiving directions having intermediately situated dark zones or fields. During movement of the intruder and upon passing through one or a number of receiving regions, the radiation receiver thus is impinged in a pulse-like manner or with varying radiation intensity and the evaluation of such output signal for the purpose of delivering a signal can be accomplished in a simple manner by means of a conventional pulse detector or alternating-current voltage detector.

To produce such different mutually separated receiving regions it has become known in the art to provide a number of optical systems, for instance a number of lenses or spherical segment- or paraboloid reflectors, at the common focal point of which there is arranged the radiation receiver. In this way there can be provided a number of receiving regions corresponding to the number of optical systems. But such an arrangement is extremely complicated, especially when there are employed a large number of receiving directions, and further, the adjustment and readjustment is extremely cumbersome. Such type burglary or intrusion detectors therefore are not only complicated and expensive, but furthermore only can be accommodated with extreme difficulty to the desired operating conditions and are not effective in all instances.

Likewise known to the art is the technique of producing a conical ring-shaped receiving region by means of cone-shaped reflectors or conical lenses or prisms of revolution in conjunction with only a single optical system. To produce a number of receiving regions there would also be, however, required in this case a multiplicity of reflectors, rendering the arrangement extremely complicated and expensive. Therefore, such installations in practice have been limited to a single cone-shaped receiving region.

With a further arrangement which has become part of the state-of-the-art employing strip-shaped receiving regions, it is indeed possible to improve upon the operational reliability and effectiveness of the system, but there is still required a complicated optical system which is assembled together, for instance composed of surfaces having two different main radii of curvature or utilizing cylindrical lenses.

SUMMARY OF THE INVENTION

Hence, it is a primary object of the present invention to provide a new and improved construction of infrared radiation-burglary detector which is not associated with the aforementioned shortcomings and drawbacks of the prior art constructions.

Another and more specific object of the present invention aims at overcoming the aforementioned drawbacks of heretofore known infrared radiation-burglary detectors and to provide a detector having a number of separate receiving regions and possessing a simpler, less complicated construction, increased effectiveness and operational reliability, and wherein only one conventional optical system is employed.

Now in order to implement these and still further objects of the invention, which will become more readily apparent as the description proceeds, the infrared radiation-burglary detector of the present invention is manifested by the features that an internally reflecting prism surface is arranged between the optical system and the radiation receiver, such prism surface encloses the axis of the optical system and is arranged substantially axially parallel thereto.

With respect to the term prism surfaces or prism surface means there is to be understood all such surfaces which are formed by parallel displacement of a straight line and having a cross-section composed of optional curvilinear or straight lines, for instance also cylinders of circular or elliptical cross-section or multi-sided prisms of polygonal shape, for instance rectangular cross-section.

By means of this prism surface there is not only focused upon the radiation receiver radiation propagated in the direction of the optical axis, but additionally radiation coming from certain incident directions, and which is reflected once, twice, three times . . . n-times at the inner surface of the prism. Consequently, the radiation receiver practically only receives radiation from a number of discrete directions which form predetermined angles with the optical axis. Depending upon the cross-section of the prism there are formed different receiving direction patterns. In the case of a circular-shaped cross-section, in other words when the prism surface is formed as a cylinder, there is produced a receiving direction pattern containing concentric conical rings extending about the optical axis. The number of conical rings corresponds to the maximum possible number of reflections at the inner surface of the cylinder. With rectangular or square cross-section of the prism there is produced a grid-shaped or raster-shaped receiving direction pattern. With square cross-section both of the grid constants are the same, but with rectangular cross-section different. In each instance it is possible to produce a multiplicity of receiving directions or receiving regions by means of such reflecting prism surface in the most simple manner and with very little expenditure with only a single optical system constructed in conventional manner.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENT

Figure 1:
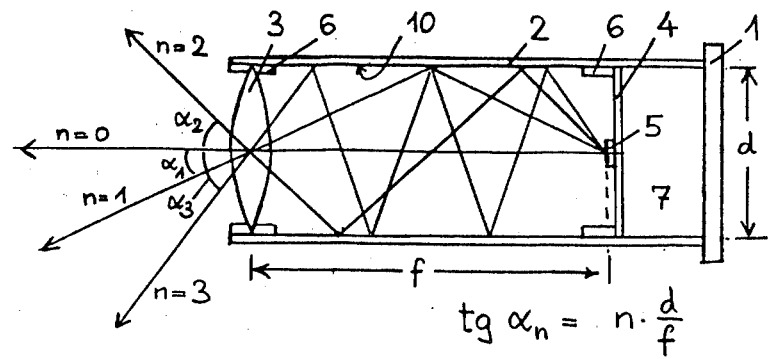
FIG. 1 schematically illustrates the principles of an infrared radiation-burglar detector constructed according to the present invention.

Referring now to the drawings, for the radiation detector arrangement illustrated in FIG. 1, there is arranged within a substantially tubular-shaped housing 2 secured to a base plate 1, at the front side of such housing 2, a collecting lens 3 serving as a focusing optical system. At the focal point of the collecting lens 3 there is arranged a radiation receiver 5 upon a support plate 4.

The optical system 3 can be constructed as a simple spherical lens or as a conventional lens system which advantageously is corrected such that the focal surface is constituted by at least approximately a plane perpendicular to the optical axis. The material of the lens must of course be permeable for the infrared radiation which is to be absorbed. Instead of glass there also could be used a suitable plastic or germanium having enhanced permeability to infrared radiation. The lens also can be constructed as an echelon lens of the Fresnel type, so that its thickness and infrared absorption can be maintained small. However, it is also conceivable to use a reflector instead of a lens. As the radiation receiver 5 there is advantageously employed an infrared receiver which is selectively sensitive in the wavelength range to be evaluated, for instance a thermo-receiver forwardly of which there is arranged an infrared band filter, for instance formed of germanium, of a suitable alkali halogenide or from one or a number of plactic layers, with or without additional vapor deposition at its surface.

The inner surface of the tubular-shaped housing 2 has the shape of a usual prism of random, curvilinear limited cross-section or a cross-section composed of straight lines. In particular there can be used a tube having a circular-shaped or circular cross-section, and the prism surface is then substantially in the form of a cylindrical surface, or there can be used a tube having a rectangular or square cross-section, whereby there is formed a quadrilateral prism. Instead of the foregoing the cross-section can be however selected to be also polygonal in shape, so that a multi-sided prism is formed.

The inner surface of the housing 2, which may be configured as above-described, is constructed to be completely reflecting or is reflective at certain locations, at least in the wavelength range of the employed infrared radiation. Thus, in the arrangement of FIG. 1 there is indicated by reference character 10 a reflective coating formed of any suitable reflecting material, typically silver or aluminium.

The described arrangement ensures that not only the radiation n=0 in the direction of the optical axis is focused by the optical system 3 upon the radiation receiver 5, but likewise radiation from other exactly defined directions which form a predetermined angle $\alpha 1$, $\alpha 2$, ... with the optical axis. On the other hand, radiation transmitted from intermediately situated angular regions is not focused at the receiver, rather impinges upon the support plate 4 constructed to absorb radiation. It will be recognized for instance that radiation from one direction which forms an angle $\alpha_1$ = arctan $(d/f)$ with the optical axis, after having been reflected once at the inner wall, impinges upon the radiation receiver 5, not however radiation from other directions. After double reflection at the inner wall there arrives, on the other hand, at the receiver 5 only such radiation which forms with the optical axis an angle $\alpha_2$ = arctan $(2d/f)$, and generally after n-time reflections only such radiation which forms an angle $\alpha_n$ = arctan $(n.d/f)$. On the other hand, in the intermediately located angular ranges there is not received any radiation. The order number $n$ of the reflected radiation which just can be received by such radiation detector is determined by the length of the reflecting portion 10 of the inner wall of the housing 2 and can be limited towards an upper value by the provision of the additional diaphragm 6, and also if desired by not particularly illustrated diaphragms arranged in front of the optical system 3. The aperture angle of the individual receiving directions is essentially determined by the quality of the optical system 3, the exactness of the arrangement of the receiver 5 at the focal point and the expanse of the radiation receiver 5.

The evaluation circuit for the output signals of the radiation receiver 5 is arranged in the intermediate space 7 between the support plate 4 and the base plate 1 and in principle can be constructed in any conventional manner as is well known in this particular art.

Figure 2:
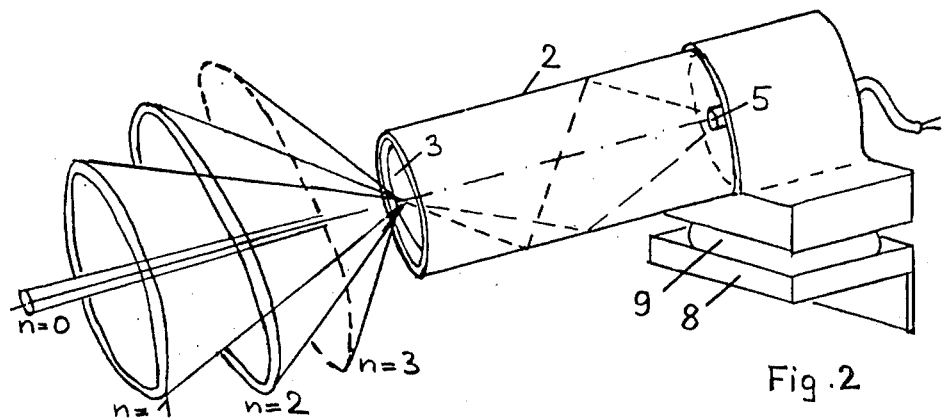
FIG. 2 illustrates a burglary detector according to the invention having a cylindrical reflector.

FIG. 2 illustrates an exemplary embodiment of burglary detector having a circular-shaped cross-section, in other words possessing a cylindrical-shaped constructed reflector 2 provided with a reflecting inner surface, for instance with the reflecting coating 10 as discussed above for FIG. 1. Due to this axially symmetrical arrangement there are formed concentric, conical ring-shaped receiving regions about the optical axis $n=0$ of different order $n=1$, $n=2$, $n=3$, ... depending upon the number of reflections taking place at the inner wall prior to impingement of the radiation at the receiver 5.

As illustrated in FIG. 2 such a burglary or intruder detector can be rotatably or pivotably secured at a mounting socket 8 by means of a ball-and-socket joint 9 or equivalent means, so that it can be easily adjusted for certain operating conditions. The protected room or region is thus covered by concentric receiving regions which can only be circumvented with extreme difficulty by an intruder or burglar.

Figure 3:
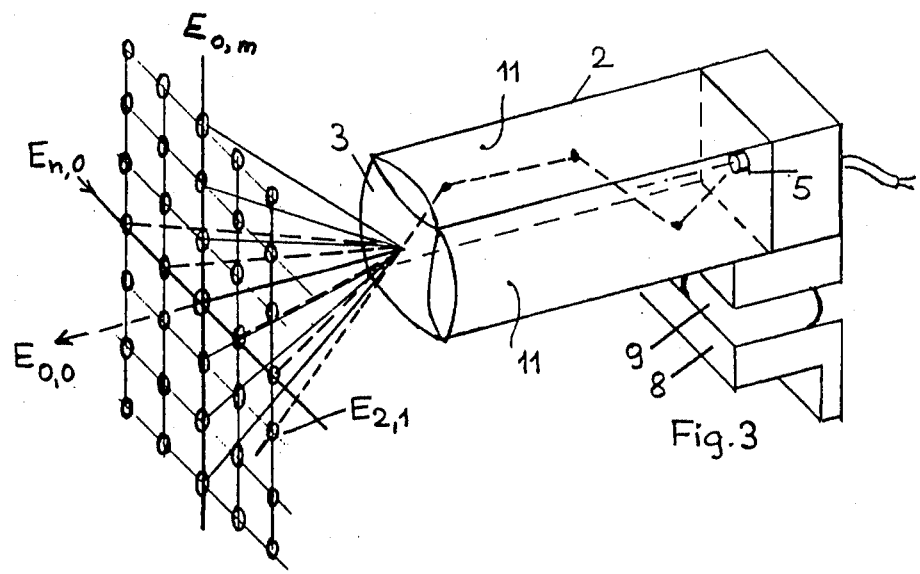
FIG. 3 illustrates a burglary detector according to the invention equipped with a quadratic prism.

In practice there is oftentimes required a grid- or raster-shaped receiving pattern. As shown in FIG. 3 such an arrangement of the receiving region or receiving directions can be realized in that the reflecting surface is constructed as a multi-sided prism of rectangular or square cross-section. Due to the reflection at the side surfaces there appears a horizontal fanning of the receiving directions, whereas due to reflection at the upper and lower sides there appears a vertical subdivision. The reflecting sides of the prism are provided with the reflecting coating 11, as previously explained. With the combination of reflections both at the side surfaces as well as also at the upper and lower sides there then is formed the illustrated grid pattern about the optical axis $E_{o,o}$. In FIG. 3 the path of the rays for instance from a receiving direction $E_{2,1}$ is illustrated with double reflection at the side surfaces and a single reflection at the upper surface or side. In toto there is thus realized a grid-like pattern of receiving directions $E_{n,m}$, and the grid constants in both directions are dependent upon the side ratio of the cross-section of the rectangle. With square cross-section both of the grid constants are equal.

When selecting different cross-sections there are formed other receiving direction patterns, similar to the defraction patterns known from optics. For instance, in the case of a hexigonal cross-section there is formed a receiving direction grid composed of equalateral triangles, corresponding to the defraction pattern of a hexagonal crystal.

Instead of applying a reflecting coating to all prism surfaces it is possible to only construct two oppositely situated surfaces so as to be internally reflecting, such as the oppositely situated side surfaces of FIG. 3 as indicated by reference character 11. In this case the prism surface consist of two parallel planes, between which there is located the optical axis. FIG. 1 shows a section through this linear symmetrical arrangement, perpendicular to the reflection surfaces and parallel to the axis. There is formed a series of receiving directions aligned along a straight line, i.e. if in FIG. 3 there is only applied a reflecting coating to the sides there are only present the receiving directions $E_{n,o}$. By using a cylindrical lens as the optical system such can be however distorted into vertical receiving strips.

Finally, it is mentioned that the principle of the invention, namely the generation of discrete receiving directions by means of a single- or multiple reflections at an axially parallel surface also can be employed with equivalent effect at other radiation detectors. For instance, it is possible to employ instead of a collecting lens a spherical- or paraboloid-reflector, at the focal point of which there is arranged the radiation receiver 5. There also exists the possibility of using, instead of an air-filled tube, a solid radiation-transparent glass- or plastic body, for instance the body 2 of FIG. 2 or FIG. 3, having a refractive index greater than 1 and use is made of its internal reflection or there is applied a reflecting coating or layer to the surface of this body 2. With such a reversal of the construction according to FIG. 2, the radiation reaching the interior of the body at the receiver side through the end surface 4, or in the case of somewhat inclined incidence of the radiation through the side surfaces of the prism, after reflection at the spherical end surface 3 functioning as the optical system and after a single- or multiple reflections at the boundary surfaces of the body 2, is focused at the radiation receiver 5. Of course, here also there may be provided a separate lens or optical system 3 for the solid body 2. In order to avoid that the radiation entering through the side surfaces and that which is reflected mutually hinder or eliminate one another, the oppositely situated prism surfaces can only be partially reflectively coated, for instance to be semi-pervious, or however, only one side can be coated to be reflecting, and the reflection zones or fields at both sides are mutually offset and alternate with transparent zones or fields. With such inverse arrangement there can be produced a similar grid-shaped receiving region pattern, wherein however only each second receiving field is eliminated.

While there are shown and described present preferred embodiments of the invention, it is to be distinctly understood that the invention is not limited thereto, but may be otherwise variously embodied and practiced within the scope of the following claims.

What is claimed is:

1. An infrared radiation-burglary detector comprising a single radiation receiver, an optical system for focusing radiation upon the single radiation receiver from a number of separate receiving regions, said optical system having an optical axis, internally reflecting prism surface means arranged between the optical system and the radiation receiver, said internally reflecting prism surface means enclosing said optical axis of the optical system and being arranged substantially axially parallel thereto, said optical system focusing radiation on said single radiation receiver from different ones of said receiving regions after a different number of reflections for each receiving region at said internal prism surface means.

2. The detector as defined in claim 1, wherein the optical system comprises at least one lens.

3. The detector as defined in claim 1, wherein the radiation receiver is arranged at the focal point of the optical system.

4. The detector as defined in claim 1, wherein said prism surface means possesses a substantially circular-shaped cross-sectioned configuration and comprises a cylinder.

5. The detector as defined in claim 1, wherein the prism surface means possesses a substantially quadrangular cross-sectional configuration.

6. The detector as defined in claim 5, wherein the prism surface means possesses a substantially rectangular cross-sectional configuration.

7. The detector as defined in claim 5, wherein the prism surface means possesses a substantially square cross-sectional configuration.

8. The detector as defined in claim 1, wherein the prism surface means possesses two substantially parallel, planar, internally reflectively coated surfaces.

9. The detector as defined in claim 1, further including a mounting component, means for displaceably mounting the detector at the mounting component.

10. The detector as defined in claim 1, wherein the prism surface means comprises the inner surface of a tubular member which is reflectively coated at its inside.

11. The detector as defined in claim 1, wherein the prism surface means comprises the outer surface of a radiation-pervious body having a refractive index greater than 1.

12. The detector as defined in claim 11, wherein the outer surface of the radiation-pervious body is at least partially reflectively coated.

13. The detector as defined in claim 11, wherein the optical system is formed by an end surface of the radiation-pervious body.

14. The detector as defined in claim 1, wherein the radiation receiver is arranged downstream of the optical system with respect to the direction of propagation of the radiation, and said different number of reflections for each receiving region occuring at the internally reflecting prism surface means at locations between said optical system and said single radiation receiver.

15. An infrared radiation-burglary detector comprising a radiation receiver, an optical system for focusing radiation upon the radiation receiver from a number of separate receiving regions, said optical system having an optical axis, internally reflecting prism surface means arranged between the optical system and the radiation receiver, said internally reflecting prism surface means enclosing said optical axis of the optical system and being arranged substantially axially parallel thereto, said optical system focusing radiation on said radiation receiver from different ones of said receiving regions after a different number of reflections for each receiving region at said internal prism surface means.

* * * * *